(12) United States Patent
Malecki et al.

(10) Patent No.: US 10,075,346 B2
(45) Date of Patent: Sep. 11, 2018

(54) COMPUTING RESOURCE LICENSE PLANNING

(71) Applicant: International Business Machines Corporation, Armonk, NY (US)

(72) Inventors: Bartlomiej T. Malecki, Slomniki (PL); Wlodzimierz Martowicz, Cracow (PL); Piotr Padkowski, Lodz (PL); Marek Peszt, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 14/723,906

(22) Filed: May 28, 2015

(65) Prior Publication Data

US 2016/0352585 A1 Dec. 1, 2016

(51) Int. Cl.
*H04L 12/24* (2006.01)
*H04L 29/08* (2006.01)
*H04L 29/06* (2006.01)
*H04L 12/26* (2006.01)

(52) U.S. Cl.
CPC .............. *H04L 41/20* (2013.01); *H04L 43/06* (2013.01); *H04L 67/10* (2013.01); *H04L 67/2857* (2013.01); *H04L 67/42* (2013.01)

(58) Field of Classification Search
CPC ......... H04L 41/20; H04L 43/06; H04L 67/10; H04L 67/2857; H04L 67/42
USPC ....................................... 709/223
See application file for complete search history.

(56) References Cited

U.S. PATENT DOCUMENTS

| 7,831,457 | B2 | 11/2010 | Varadarajan et al. | |
| 2001/0011253 | A1* | 8/2001 | Coley | G06F 21/10 705/59 |
| 2004/0260589 | A1* | 12/2004 | Varadarajan | G06Q 10/0631 705/7.18 |
| 2005/0049973 | A1* | 3/2005 | Read | G06Q 10/06 705/59 |
| 2011/0296398 | A1* | 12/2011 | Vidal | G06F 8/65 717/171 |
| 2014/0052610 | A1* | 2/2014 | Aggarwal | G06Q 10/06 705/39 |
| 2014/0310619 | A1* | 10/2014 | Fickenwirth | G06F 3/048 715/762 |
| 2015/0081469 | A1* | 3/2015 | Acharyya | G06Q 30/0631 705/26.7 |
| 2015/0127497 | A1* | 5/2015 | Rao | G06F 8/71 705/28 |

* cited by examiner

*Primary Examiner* — Michael C Lai
(74) *Attorney, Agent, or Firm* — Stephanie L. Carusillo

(57) ABSTRACT

As disclosed herein a method, executed by a computer, includes generating, by a software asset management tool (SAM), a baseline event set comprising a plurality of events corresponding to an environment. The method further includes receiving a future event set comprising one or more future events corresponding to the environment. The method further includes combining the future event set and the baseline event set to produce an effective event set. The method further includes performing calculations and generating reports corresponding to the effective event set. A computer system, and a computer program product corresponding to the method are also disclosed herein.

20 Claims, 6 Drawing Sheets

COMPUTING RESOURCE LICENSE PLANNING

BACKGROUND

The present invention relates generally to management of computing resources, and more particularly to planning future computing resource requirements.

Industry is reliant on information technology (IT) infrastructure (e.g., hardware and software) to enable companies to effectively conduct business. The infrastructure associated with many companies has become vast and complex, encompassing not only desktop computers, but laptops, servers, smart phones, tablets, and countless other electronic devices. Additionally, the software (e.g., applications) used within the infrastructure is continually expanding and changing. The ability of an organization to effectively manage its infrastructure reflects the image of the organization as a business. IT organizations face many challenges, and critical among those challenges is the pressure to control costs and be agile. Tracking information such as computing resource licensing requirements in an ever changing IT environment is an important part of meeting the challenges of cost control.

SUMMARY

As disclosed herein a method, executed by a computer, includes generating, by a software asset management tool (SAM), a baseline event set comprising a plurality of events corresponding to an environment. The method further includes receiving a future event set comprising one or more future events corresponding to the environment. The method further includes combining the future event set and the baseline event set to produce an effective event set. The method further includes performing calculations and generating reports corresponding to the effective event set. A computer system, and a computer program product corresponding to the method are also disclosed herein.

DETAILED DESCRIPTION

Software asset management (SAM) is a business practice that involves managing and optimizing the purchase, deployment, maintenance, utilization, and disposal of software resources within the information technology (IT) infrastructure of an organization. Many organizations use SAM tools to detect and monitor existing license consumption within the IT infrastructure. Many SAM tools provide reporting capabilities such as, but not limited to, hardware inventory reports, integrated software inventory, usage reports, and gap analysis between detected occurrences of a software package installed and the actual number of licenses purchased for the software package.

In today's fast paced world, organizations are continually struggling to control operating budgets, and included in those budgets are the costs for computing resources licenses. In an effort to predict future costs, organizations may attempt to determine future licensing requirements associated with planned infrastructure changes. Current SAM tools analyze computing resources and license consumption within the existing infrastructure. Embodiments of the present invention recognize the need to enable SAM tools to analyze the effects of planned infrastructure changes. SAM reports based on analysis of planned infrastructure changes may enable organizations to determine the effects of planned changes on future license consumption and ultimately assist in estimating future operating expenses.

Figure 1:
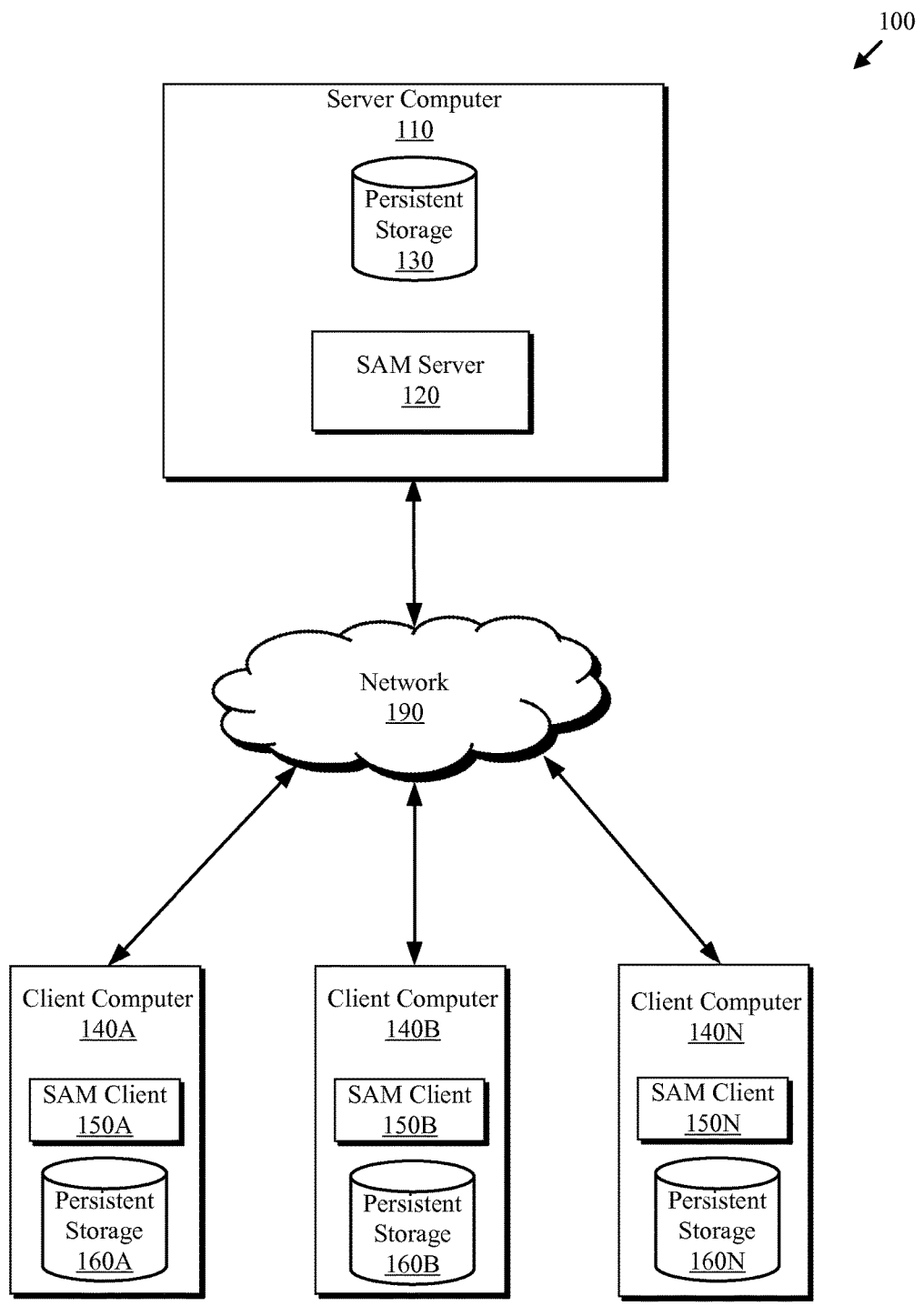
FIG. 1 is a functional block diagram depicting a computing environment in accordance with an embodiment of the present invention.

FIG. 1 is a functional block diagram depicting a computing environment 100 in accordance with an embodiment of the present invention. Computing environment 100 includes server computer 110 and one or more client computers 140A-140N which can be smart phones, tablets, desktop computers, laptop computers, specialized computer servers, or any other computer systems known in the art. In some embodiments, server computer 110 and client computers 140A-140N represent computer systems utilizing clustered computers and components to act as a single pool of seamless resources when accessed through a network 190. In general, server computer 110 and client computers 140A-140N are representative of any electronic devices, or combination of electronic devices, capable of executing machine-readable program instructions, as described in greater detail with regard to FIG. 4.

As depicted, client computers 140A-140N may include system asset manager (SAM) clients 150A-150N, and persistent storage 160A-160N. SAM Clients 150A-150N may be configured to scan client computers 140A-140N, to detect installed software (e.g., applications, program products, and the like) and produce an inventory of asset information corresponding to the client computer. SAM Clients 150A-150N may store the inventory information retrieved during the scan operation on persistent storage 160A-160N.

As depicted, server computer 110 may include SAM server 120 and persistent storage 130. SAM server 120 may be configured to receive the inventory information from SAM clients 150-150N and store the inventory information on persistent storage 130. Additionally, SAM server 120 may be configured to analyze the received the inventory information and generate reports corresponding to the analysis. The generated reports may be stored on persistent storage 130, or provided to a user using an external I/O device such as a display or printer (not shown). Server computer 110 and client computers 140A-140N communicate over network 190.

Network 190 can be, for example, a local area network (LAN), a wide area network (WAN) such as the Internet, or a combination of the two, and include wired, wireless, or fiber optic connections. In general, network 190 can be any combination of connections and protocols that will support communications between server computer 110 and client computers 140A-140N in accordance with an embodiment of the present invention.

Figure 2:
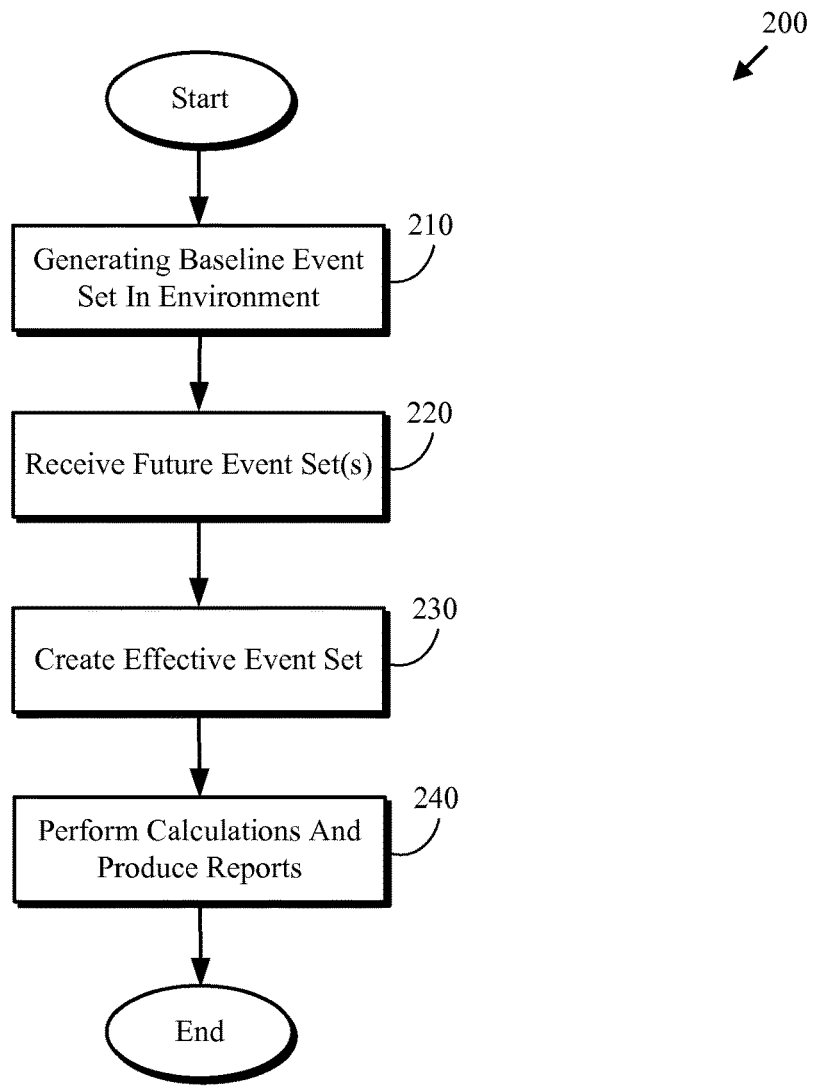
FIG. 2 is a flowchart depicting an asset management method, in accordance with an embodiment of the present invention.

FIG. 2 is a flowchart depicting an asset management method 200 in accordance with an embodiment of the present invention. As depicted, asset management method 200 includes generating (210) a baseline event set corresponding to an environment, receiving (220) a future event set, creating (230) an effective event set, and performing (240) calculations and producing reports. A SAM tool may be used to inventory and manage computing resources within at least a portion of the IT infrastructure of a company. The SAM tool may comprise a SAM server (e.g., SAM Server 120) and a number of SAM clients (i.e. SAM Clients 150A-150N) running on clients computers (i.e., client computers 140A-140N) as described in FIG. 1. Asset management method 200 enables the SAM tool to analyze a planned infrastructure change and provide reports identifying the effect of the change on the infrastructure.

Generating (210) a baseline event set corresponding an environment may include detecting and identifying all computing resources currently present in the IT infrastructure managed by the SAM tool. Detecting the computing resources may include SAM Server 120 receiving from each SAM client (i.e., SAM clients 150A-150N) an inventory of software currently installed on the client on which the SAM client is installed (e.g., SAM Clients 150A-150N). After receiving the inventory information from each SAM client, SAM Server 120 merges and analyzes the inventory information, providing a baseline event set. The baseline event set may be stored on a persistent storage device (e.g., persistent storage 130) for retrieval and use during future analysis or report generation. Once generated, the baseline event set is a current representation of the computing resources (i.e., a set of the one or more events) in the current environment. The baseline event set may not be directly edited.

Receiving (220) a future event set may include SAM server 120 receiving a collection (i.e., set) of events scheduled to occur in the future. An event is any atomic change in the infrastructure that affects overall license consumption. Events in the future event set may include, but are not limited to, adding a new software package to one or more client computers, adding an additional client computer to the infrastructure, removing a software package from one or more client computers, and removing a client computer from the infrastructure. While the baseline event set may not be directly edited (i.e. altered), future event sets may be altered to reflect future changes. In some embodiments, there are commands to alter a future event set, such as, for example, a commands to add an event to a future event set, delete an event from a future event set, modify an existing event in a future event set, initialize (e.g., create) a new future event set, and free (e.g., delete) a future event set if the future event set is no longer needed.

In some embodiments, there is a chronological order among all events within a future event set (i.e., each event is scheduled to begin at a specific time). In other embodiments, the begin time only identifies the time at which the future event set is to become active, while the actual begin time for each individual event included in the future event set is identified as a relative offset from the begin time of the future event set. In another embodiment, each event in the future event set has an absolute begin time associated with the event, and the time corresponding to the future event set is the earliest begin time corresponding to any of the events included in the future event set.

In some embodiments, more than one future event set may be received, with each identifying a set of changes to the infrastructure. In other embodiments, it is possible to merge (i.e., combine) two or more future event sets producing a new merged future event set. In some embodiments, the original (i.e., unmerged) future event sets are removed once they are merged to create the new merged future event set. In other embodiments, once the merged future event set is created, all future event sets (i.e., the original future event sets and the new merged future event set) are retained. All future event sets may be stored on a persistent storage device (e.g., persistent storage 130) for retrieval and use during future analysis or report generation.

Creating (230) an effective event set may include SAM server 120 creating an event set that includes the baseline event set and a future event. In some embodiments, SAM server 120 merges the baseline event set with a single future event set to create an effective event set. In other embodiments, SAM server 120 merges the baseline event set with one or more future event sets to create an effective event set. In some embodiments, SAM server 120 retains more than one effective event set. Retaining multiple effective event sets may enable analysis of multiple scenarios involving different change plans. All effective event sets may be stored on a persistent storage device (e.g., persistent storage 130) for retrieval and use during future analysis or report generation. An effective event set may not be directly edited, but it may be altered by altering the contents of a future event set included in the effective event set. In some embodiments, there are commands to free (e.g., delete) an effected event set if the effective event set is no longer needed.

Performing (240) calculations and producing reports may include SAM server 120 performing analysis operations on an effective event set. The analysis operations may include identifying the type and number of clients (e.g., client computers 140A-140N), identifying each software product that is detected, identifying the number of times each software product is detected, identifying configuration and resource changes (e.g., the amount of client resource currently allocated, and the like. Once the analysis operation has completed, the analysis results and any generated reports may be saved to persistent storage (e.g., persistent storage 130). All or part of the saved analysis results may be retrieved at a later time for additional analysis or report generation.

In Some embodiments, saving an effective event set (e.g. saving to persistent storage 130) includes retaining information that identifies each future event set included in the effective event set. In other embodiments, retaining information that maps future event sets to effective event sets may enable SAM server 120 to determine if changes have occurred to a future event set that require an effective event set to be re-analyzed. In yet other embodiments, SAM server 120 detects changes in the baseline (e.g., a licensed software product was removed from a group of client computers) and the detected changes require an effective event set to be re-analyzed. If an effective event set requires re-analysis, some embodiments produce a notification (e.g., an alert) identifying the need to re-analyze any effective event sets affected by the alteration. The notification may be in the form of a system alert, and email to an administrator, or some other method familiar to those of skill in the art. In other embodiments, an alteration that effects a saved effective event set causes automatic re-analysis the affected effective event set. Automatic re-analysis may also include recalculation and regeneration of any reports that had previously been generated.

Figure 3A:
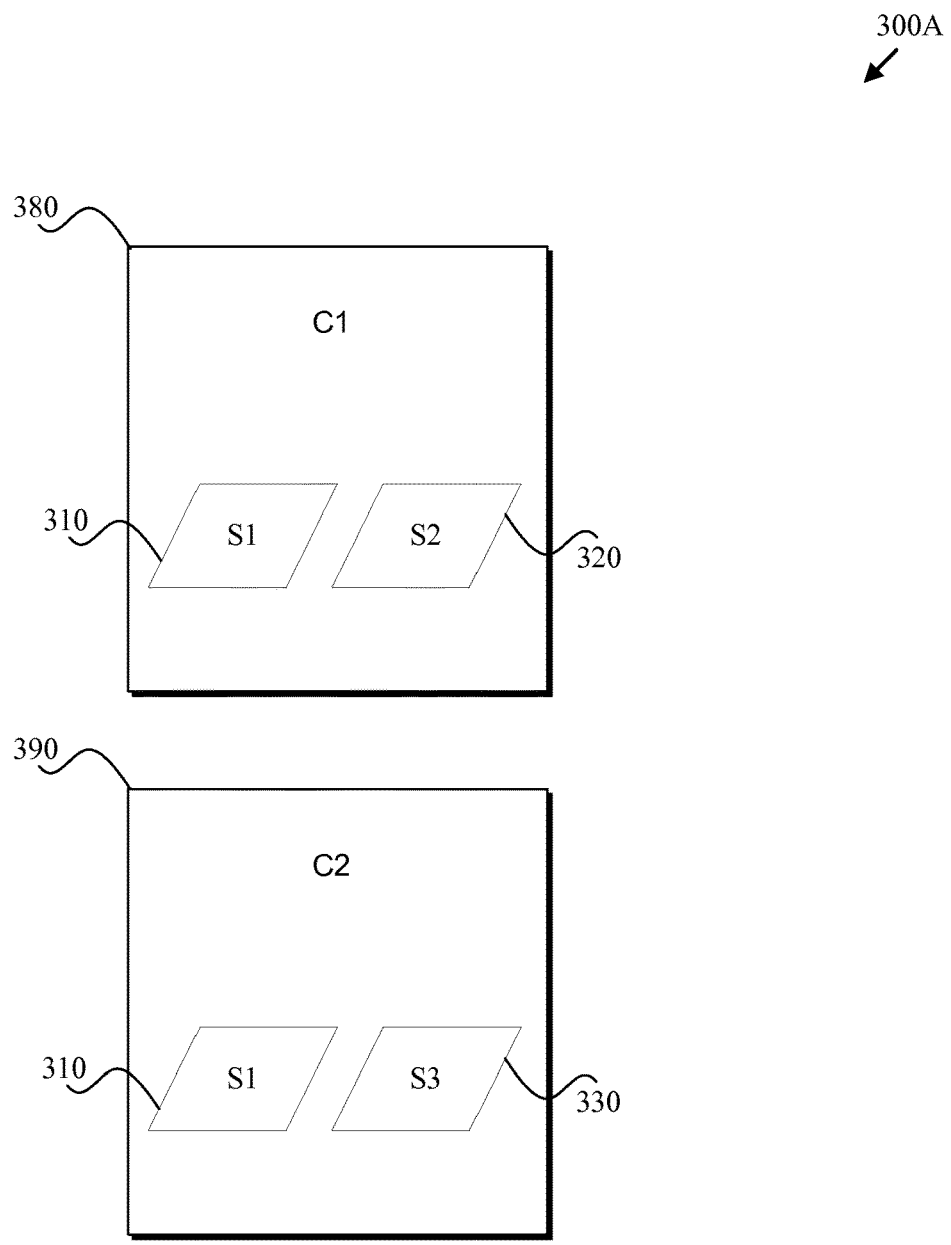
FIG. 3A depicts an example of client computers, in accordance with an embodiment of the present invention.

FIG. 3A depicts an example 300A of client computers in a SAM monitored environment, in accordance with an embodiment of the present invention. In the depicted example, client computers 380 and 390 are part of a SAM tool monitored environment. Client computer 380 includes installed software products 310 and 320. Client computer 390 includes installed software products 310 and 330.

Figure 3B:
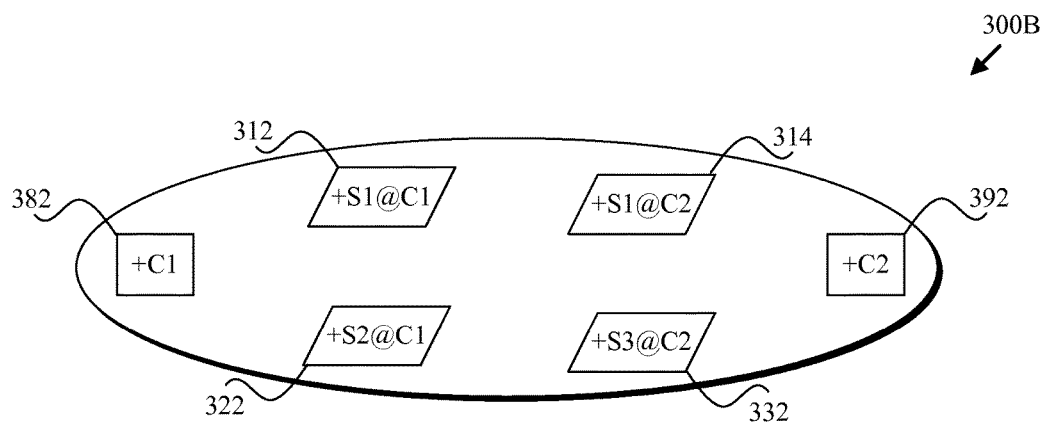
FIG. 3B depicts an example baseline event set, in accordance with an embodiment of the present invention.
Figure 3C:
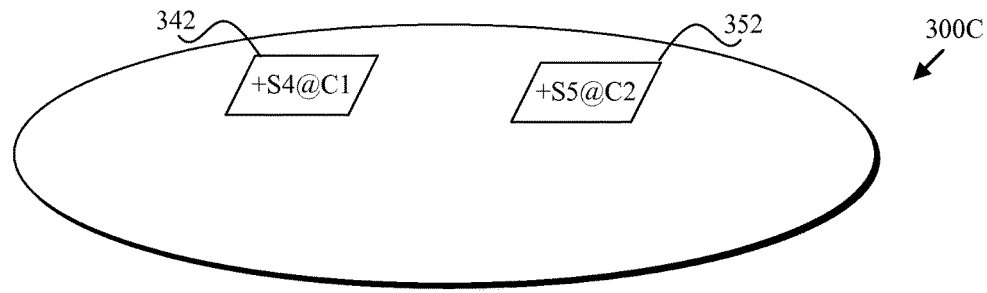
FIGS. 3C-3D depict example future event sets, in accordance with an embodiment of the present invention.
Figure 3D:
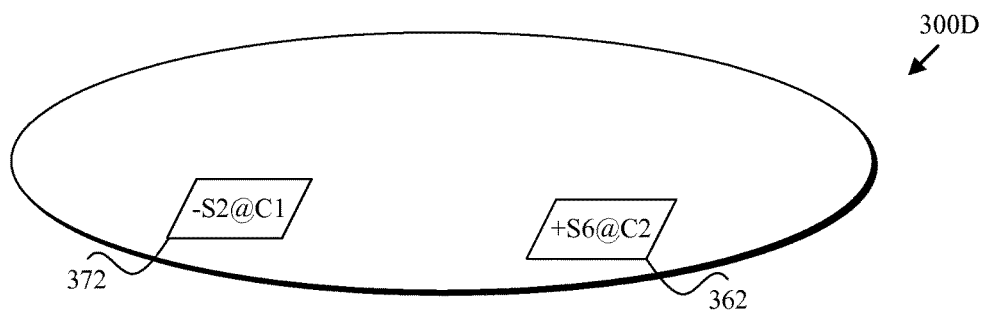

FIG. 3B depicts an example of a baseline event set 300B. Included in baseline event set 300B are events 381 and 392 for client computers 380 and 381, as well as events 312, 314, 322, and 332 for installed software products 310, 320, and 330. Events 312 and 314 indicate two unique installations of software product 310. FIGS. 3C-3D depict an example of a future event set 300C and a future event set 300D, in accordance with an embodiment of the present invention. As depicted, future event set 300C includes events 342 and 352 to add software products S4 and S5 to the SAM tool monitored environment. Future event set 300D includes event 362 to add software product S6 to the SAM tool monitored environment and event 372 to remove software S2 (320) from the SAM tool monitored environment.

In the depicted examples, any event that has been detected or added to the SAM monitored environment is indicated with a leading plus sign (i.e., +) while any event that results in removing a computer client or software product from the SAM monitored environment is indicated with a leading minus sign (i.e., −). Also, in the depicted examples, each occurrence of a software product is associated with a computer client. For example, "+S1@C1" indicates that software product S1 (310) either exists on, or will be added to, computer client C1 (380), and "−S2@C1" indicates that software product S2 (320) will be removed from computer client C1 (380).

Figure 3E:
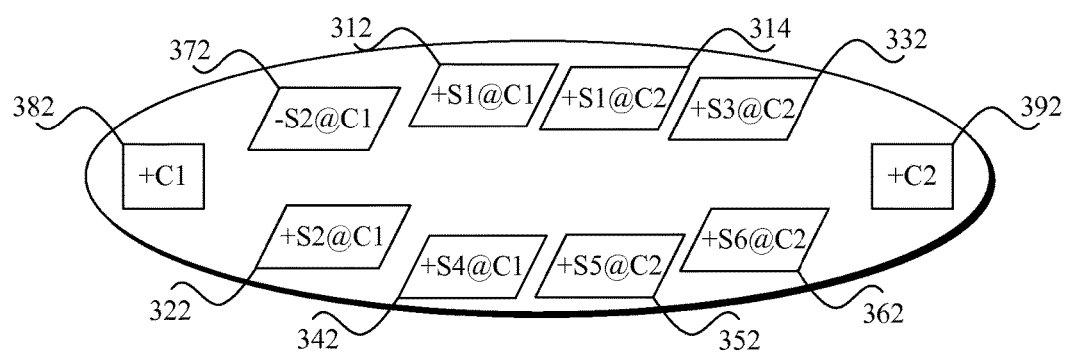
FIG. 3E depicts an example effective event set, in accordance with an embodiment of the present invention.

FIG. 3E depicts an example effective event set 300E, in accordance with an embodiment of the present invention. As depicted, effective event set 300E is generated as a result of merging baseline event set 300B, and future event sets 300C and 300D. Effective event set 300E includes events 312, 314, 322, 330, 381, and 392 from baseline event set 300B. Effective event set 300E also includes events 342, 352, 362, and 372 from future event sets 300C and 300D.

SAM server 120 may analyze effective event set 300E. The results of the analysis may be used to generate reports that aid with predicting license consumptions. In some embodiments, the generated reports identify all client computers running a specific software product at a specific time (e.g., during peak charge times). In other embodiments, the generated reports identify client computers with available virtual processors. In some other embodiments, the generated reports provide trend graphs for individual client computers and/or all client computers.

Figure 4:
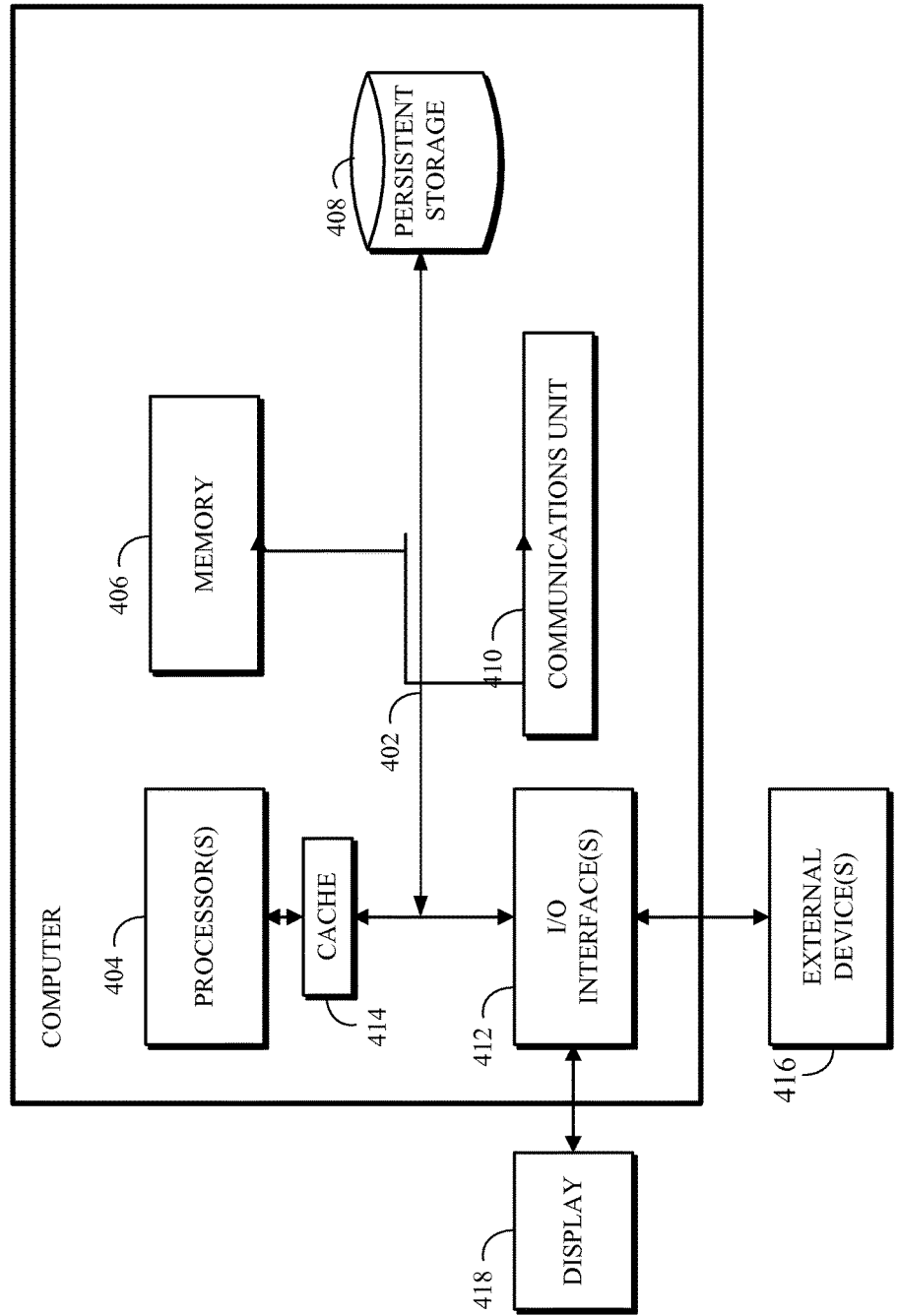
FIG. 4 is a block diagram depicting various components of one embodiment of a computer suitable for executing the methods disclosed herein.

FIG. 4 depicts a block diagram of components of a computer system 400, which is an example of a system such as server computer 110 and client computers 140A-140N within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 110 and client computers 140A-140N include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., asset management method 200, are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server computer 110 and client computers 140A-140N. In these examples, communications unit 410 includes one or more network interface cards. Communications unit 410 may provide communications through the use of either or both physical and wireless communications links. Program instructions and data used to practice embodiments of asset management method 200 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
  generating, by a software asset management tool, a baseline event set comprising a plurality of events corresponding to an environment;
  receiving, by the software asset management tool, a future event set comprising one or more future events corresponding to the environment, wherein the one or more future events comprise at least one of: adding a software package to one or more client computers, removing a software package from one or more client computers, adding a client computer to the environment, and removing a client computer from the environment;

combining, by the software asset management tool, the future event set and the baseline event set to produce an effective event set;

performing, by the software asset management tool, calculations corresponding to the effective event set, wherein the calculations include identifying a type and a number of client computers, identifying a number of software packages detected on the client computers, and identifying client computers running a software package at a specified time; and identifying, by the software asset management tool, client computers with available processors at the specified time.

2. The method of claim 1, wherein the baseline event set, the future event set, and the effective event set each comprise a set of one or more events.

3. The method of claim 1, wherein each event of the plurality of events and the one or more future events corresponds to an atomic change to an infrastructure that affects overall license consumption.

4. The method of claim 1, further comprising identifying a required analysis corresponding to the effective event set in response to a change to the future event set.

5. The method of claim 1, further comprising identifying a required analysis corresponding to the effective event set in response to a change to the baseline event set.

6. The method of claim 1, wherein two future events event sets are combined to produce a merged future event set.

7. The method of claim 1, wherein the environment comprises hardware and software of an infrastructure being monitored by the software asset management tool.

8. A computer program product comprising:
one or more computer readable storage media and program instructions stored on the one or more computer readable storage media, the program instructions comprising instructions to:
generate, by a software asset management tool, a baseline event set comprising a plurality of events corresponding to an environment;
receive, by the software asset management tool, a future event set comprising one or more future events corresponding to the environment, wherein the one or more future events comprise at least one: of adding a software package to one or more client computers, removing a software package from one or more client computers, adding a client computer to the environment, and removing a client computer from the environment;
combine, by the software asset management tool, the future event set and the baseline event set to produce an effective event set;
perform, by the software asset management tool, calculations corresponding to the effective event set, wherein the calculations include identifying a type and a number of client computers, identifying a number of software packages detected on the client computers, and identifying client computers running a software package at a specified time; and
identify, by the software asset management tool, client computers with available processors at the specified time.

9. The computer program product of claim 8, wherein the baseline event set, the future event set, and the effective event set each comprise a set of one or more events.

10. The computer program product of claim 8, wherein each event of the plurality of events and the one or more future events corresponds to an atomic change to an infrastructure that affects overall license consumption.

11. The computer program product of claim 8, wherein the program instructions comprise instructions to identify, in response to a change to the future event set, a required analysis corresponding to the effective event set.

12. The computer program product of claim 8, wherein the program instructions comprise instructions to identify, in response to a change to the baseline event set, a required analysis corresponding to the effective event set.

13. The computer program product of claim 8, wherein two future event sets are combined to produce a merged future event set.

14. The computer program product of claim 8, wherein the environment comprises hardware and software of an infrastructure being monitored by the software asset management tool.

15. A computer system comprising:
one or more computer processors;
one or more computer readable storage media;
program instructions stored on the computer readable storage media for execution by at least one of the computer processors, the program instructions comprising instructions to:
generate, by a software asset management tool, a baseline event set comprising a plurality of events corresponding to an environment;
receive, by the software asset management tool, a future event set comprising one or more future events corresponding to the environment, wherein the one or more future events comprise at least one of: adding a software package to one or more client computers, removing a software package from one or more client computers, adding a client computer to the environment, and removing a client computer from the environment;
combine, by the software asset management tool, the future event set and the baseline event set to produce an effective event set;
perform, by the software asset management tool, calculations corresponding to the effective event set, wherein the calculations include identifying a type and a number of client computers, identifying a number of software packages detected on the client computers, and identifying client computers running a software package at a specified time; and
identify, by the software asset management tool, client computers with available processors at the specified time.

16. The computer system of claim 15, wherein the baseline event set, the future event set, and the effective event set each comprise a set of one or more events.

17. The computer system of claim 15, wherein each event of the plurality of events and the one or more future events corresponds to an atomic change to an infrastructure that affects overall license consumption.

18. The computer system of claim 15, wherein the program instructions comprise instructions to identify, in response to a change to the future event set, a required analysis corresponding to the effective event set.

19. The computer system of claim 15, wherein the program instructions comprise instructions to identify, in response to a change to the baseline event set, a required analysis corresponding to the effective event set.

20. The computer system of claim 15, wherein two future event sets are combined to produce a merged future event set.

* * * * *